(12) United States Patent
Som De Cerff

(10) Patent No.: US 8,369,486 B1
(45) Date of Patent: Feb. 5, 2013

(54) SYSTEMS AND METHODS FOR TESTING TELEPHONY EQUIPMENT

(75) Inventor: Peter Som De Cerff, Broken Arrow, OK (US)

(73) Assignee: ADTRAN, Inc., Huntsville, AL (US)

( * ) Notice: Subject to any disclaimer, the term of this patent is extended or adjusted under 35 U.S.C. 154(b) by 184 days.

(21) Appl. No.: 13/016,647

(22) Filed: Jan. 28, 2011

(51) Int. Cl.
*H04M 1/24* (2006.01)
*H04M 3/08* (2006.01)
*H04M 3/22* (2006.01)

(52) U.S. Cl. ............... 379/27.02; 379/22.02; 379/24; 379/29.1; 455/67.11

(58) Field of Classification Search ............... 379/1.01, 379/10.02, 12, 21, 22, 22.01, 22.02, 23, 24, 379/27.01, 27.02, 27.03, 29.1, 31, 32.04; 455/67.11, 67.13, 67.14, 67.7, 68
See application file for complete search history.

(56) References Cited

U.S. PATENT DOCUMENTS

| | | | |
|---|---|---|---|
| 4,882,750 A * | 11/1989 | Henderson et al. | 379/355.06 |
| 5,463,670 A | 10/1995 | Chiang et al. | |
| 5,583,933 A * | 12/1996 | Mark | 379/357.04 |
| 5,732,133 A * | 3/1998 | Mark | 379/357.03 |
| 5,745,555 A * | 4/1998 | Mark | 379/93.03 |
| 5,818,930 A * | 10/1998 | Mark | 379/444 |
| 2003/0156685 A1 | 8/2003 | Erving et al. | |
| 2003/0185351 A1 | 10/2003 | Bachorik et al. | |
| 2008/0037804 A1* | 2/2008 | Shmunk | 381/96 |
| 2008/0043927 A1 | 2/2008 | Lysaght et al. | |
| 2008/0101619 A1* | 5/2008 | Shmunk | 381/59 |
| 2010/0008476 A1 | 1/2010 | Zhu | |
| 2010/0061524 A1 | 3/2010 | Ewert et al. | |

* cited by examiner

*Primary Examiner* — Binh Tieu
(74) *Attorney, Agent, or Firm* — Maynard Cooper & Gale, P.C.; Jon E. Holland

(57) ABSTRACT

A communication system comprises a network server connected to a telephone at a customer premises via a subscriber line. The server is further connected to a cellular communication device through a cellular network. Upon installation of telephony equipment at the customer premises, a service technician uses a cellular communication device to communicate with the server of the network such that the server initiates a voice call to the telephone via the subscriber line. The technician then takes the telephone off hook, aligns a speaker of the cellular communication device with a microphone of the telephone, and aligns a microphone of the cellular device with a speaker of the telephone such that the telephone and the cellular device are acoustically coupled. A plurality of acoustic tones are communicated between the telephone and the cellular communication device in order to test the quality of the inbound and/or outbound connections for the telephone.

20 Claims, 5 Drawing Sheets

US 8,369,486 B1

SYSTEMS AND METHODS FOR TESTING TELEPHONY EQUIPMENT

RELATED ART

Communication systems often have telephony equipment, such as, for example, telephones, located at customer premises to facilitate voice communication between customers through a network. The equipment is connected to the network via one or more subscriber lines. Once the equipment is installed, a service technician often performs a variety of tests to ensure that the equipment functions properly. One such test involves the technician using a cellular telephone to make a call to the equipment to verify the inbound connectivity of the equipment for signals transmitted from the network via the subscriber line. The technician may also make a call from the equipment to the cellular telephone to verify the outbound connectivity of the equipment for signals transmitted to the network via the subscriber line. Such tests are useful for verifying that a connection is made between the customer's equipment and the network across the subscriber line, but they provide a limited evaluation of the quality of such connection.

Line testers have been developed that connect to tip and ring for transmitting probe signals across a subscriber line and measuring such probe signals in order to provide more comprehensive testing of the subscriber line. However, such testers can be expensive and/or burdensome to use. Accordingly, many technicians employ line testers when there is a suspected problem with a line but do not necessarily use such testers in other situations, such as when performing routine services or installations.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for testing telephony equipment. A communication system in accordance with an exemplary embodiment of the present disclosure comprises a network server connected to a telephone at a customer premises via a subscriber line. The server is further connected to a cellular communication device through a cellular network. Upon installation of the telephone at the customer premises, a service technician accesses an application on a cellular communication device to communicate with the network server such that the server initiates a voice call to the telephone via the subscriber line. The technician then takes the telephone off hook, aligns a speaker of the cellular communication device with a microphone of the telephone, and aligns a microphone of the cellular device with a speaker of the telephone such that the telephone and the cellular device are acoustically coupled. The server then transmits a plurality of acoustic tones through the speaker of the telephone via the subscriber line to the microphone of the cellular communication device to enable determination of a parameter indicative of the quality of the inbound connection for the telephone. The cellular device's speaker also transmits a plurality of acoustic tones through the microphone of the telephone to the server via the subscriber line to enable determination of a parameter indicative of the quality of the outbound connection for the telephone.

Figure 1:
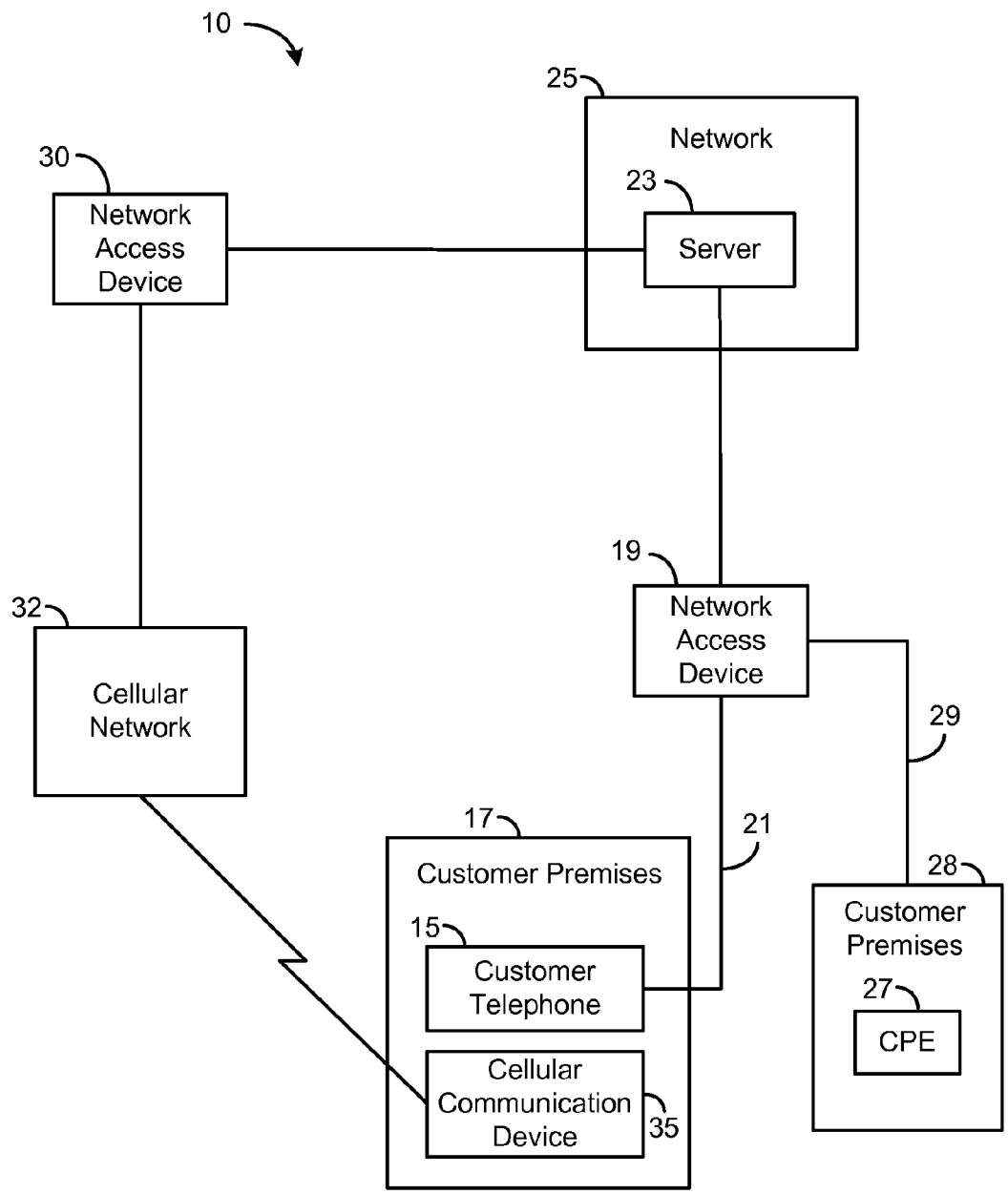
FIG. 1 is a block diagram depicting an exemplary embodiment of a communication system.

FIG. 1 depicts an exemplary communication system 10. The communication system 10 comprises a customer telephone 15 at a customer premises 17 connected to a network access device ("NAD") 19, such as, for example, a switch or a digital subscriber line access multiplexer ("DSLAM"), via a subscriber line 21. The communication system 10 further comprises a server 23 of a network 25 coupled to the NAD 19. In one embodiment, the NAD 19 is coupled to customer premises equipment (CPE) 27 for at least one other customer premises 28 via at least one other subscriber line 29. The NAD 19 may be coupled to any number of customer premises and/or subscriber lines in other embodiments.

In one embodiment, the NAD 19 is configured to demultiplex data received from the network 25 across the subscriber lines 21 and 29. The NAD 19 is further configured to multiplex data signals received from the telephones 15 via the one or more subscriber lines 21 and 29 for transmission to the network 25. The telephone 15 initiates outbound voice calls across the subscriber line 21 through the network 25, and the telephone 15 receives inbound voice calls via the subscriber line 21 as well.

The communication system 10 further comprises an NAD 30, such as, for example, a switch, coupled between the server 23 and a cellular network 32. The NAD 30 is configured to receive one or more data signals from a portable cellular communication device 35, such as, for example, a lap-top computer, a personal digital assistant (PDA), or a cellular telephone, and to transmit the data signals to the server 23 using a suitable protocol for the server 23. For example, in one embodiment, the NAD 30 is configured to transmit signals to the server 23 using Transmission Control Protocol/Internet Protocol (TCP/IP), though other protocols may be used in other embodiments. The NAD 30 is further configured to receive data signals from the server 23 and to transmit the signals through the cellular network 32 to the cellular communication device 35. Thus, a data connection is established between the device 35 and the server 23 through the cellular network 32.

The server 23 is configured to communicate with the cellular communication device 35 through the aforementioned data connection. The server 23 is further configured to sequentially generate a plurality of acoustic tones for transmission to the device 35 via a voice connection from the server 23 to the telephone 15. Such tones travel across the subscriber line 21 and pass through a speaker (not shown in FIG. 1) of the telephone 15 to the cellular communication device 35. The server 23 is also configured to receive a plurality of acoustic tones from the device 35 via the same voice connection. The server 23 is also configured to determine a parameter indicative of the quality of the tones received from the device 35 and, hence, the quality of the communication enabled by the telephony equipment at the customer premises 17 and the subscriber line 21, and the server 23 is configured to communicate information indicative of such quality via the data connection passing through the cellular network 32 to the device 35.

A service technician takes the cellular communication device 35 to the customer premises 17 when installing the telephone 15 or other telephony equipment at the customer premises 17. The cellular communication device 35 comprises a testing application (not shown in FIG. 1), discussed in more detail hereafter, for communicating with the server 23 through the cellular network 32. After installation of the telephone 15 or other telephony equipment, the service technician acoustically couples the telephone 15 and the cellular communication device 35. That is, the service technician aligns a speaker of the cellular communication device 35 with a microphone of the telephone 15 such that sounds emitted from the speaker are sensed by the microphone, and the service technician aligns a speaker of the telephone 15 with a microphone of the cellular communication device 35 such that sounds emitted from the speaker are sensed by the microphone.

Further, the cellular communication device 35 is configured to establish a data connection with the server 23 through the cellular network 32 and to communicate with the server 23 across the data connection in order to instruct the server 23 to initiate a voice call with the telephone 15 via the subscriber line 21. During the call, the server 23 is configured to transmit a plurality of acoustic tones to the telephone 15, and the device 35 is configured to receive the tones via the acoustic coupling between the telephone 15 and the device 35. Based on the received tones, the cellular communication device 35 is configured to determine a parameter (e.g., a received power level of each tone) indicative of the quality of the downstream channel and to display the parameter or information that is based on the parameter, such as an indication whether the quality of the downstream channel is deemed to be acceptable by the device 35.

In addition, the device 35 is configured to sequentially generate a plurality of acoustic tones that are received by the telephone 15 via the acoustic coupling between the telephone 15 and the device 35. The telephone 15 transmits such tones across the subscriber line 21 to the server 23. Based on the received tones, the cellular communication device 35 is configured to determine a parameter (e.g., a received power level of each tone) indicative of the quality of the upstream channel and to transmit, to the cellular communication device 35 via the data connection through the cellular network 32, the parameter or information that is based on the parameter, such as an indication whether the quality of the upstream channel is deemed to be acceptable by the server 23. The device 35 is configured to display the transmitted information to the service technician. Thus, the service technician is able to better evaluate the performance of the installed equipment and/or the subscriber line 21 while at the customer premises 17.

Figure 2:
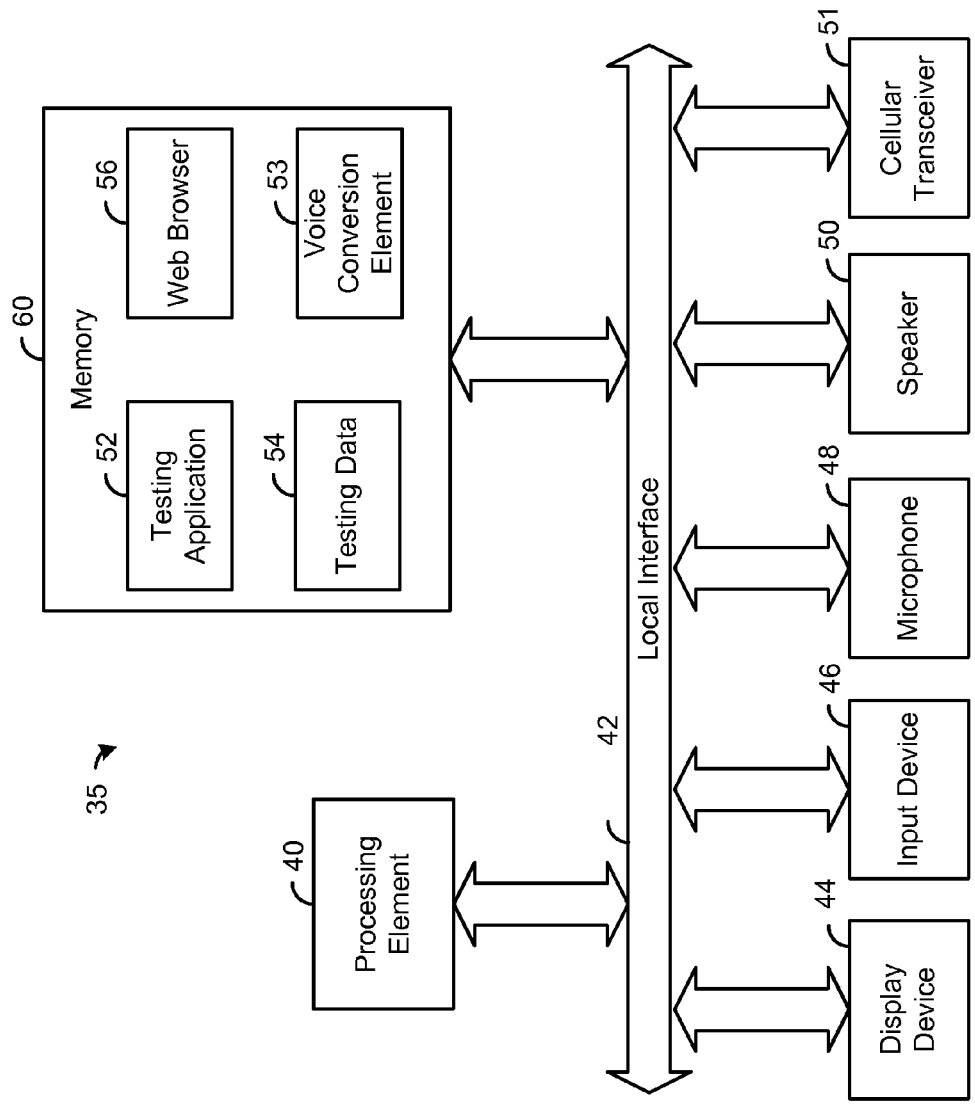
FIG. 2 is a block diagram depicting an exemplary embodiment of a cellular communication device, such as is depicted by FIG. 1.

FIG. 2 depicts an exemplary embodiment of the cellular communication device 35 of FIG. 1. The device 35 comprises at least one conventional processing element 40, such as a central processing unit (CPU) or digital signal processor (DSP), that communicates to and drives the other elements within the device 35 via a local interface 42. Furthermore, a display device 44, such as, for example, a screen, can be used to visually display data to a user, and an input device 46, such as a keypad or keyboard, can be used by the technician to input data into the device 35. Also, a microphone 48 can be used to input acoustic sound, such as speech, into the device 35, and a speaker 50 can be used to output acoustic sound from the device 35. In addition, the device 35 has a cellular transceiver 51 for communicating cellular signals with the cellular network 32.

The cellular communication device 35 further comprises a testing application 52 stored in memory 60 of the device 35. The testing application 52 is configured to establish a data connection with the server 23 (FIG. 1) through the cellular network 32 in order to run a test on the telephone 15 (FIG. 1) and/or other telephony equipment via a voice call that is established with the telephone 15. In one embodiment, the testing application 52 establishes a data connection with the server 23 through a web browser 56 using TCP/IP. However, different types of data connections using different types of protocols are possible in other embodiments. The testing application 52 is further configured to access the test results and determine whether the quality of the voice call is acceptable. It should be noted that the testing application 52 can be implemented in software, hardware, firmware or any combination thereof. In the exemplary embodiment illustrated in FIG. 3, the testing application 52 is implemented in software and stored in the memory 60 of the device 35. Furthermore, the testing application 52 is configured to sequentially generate a plurality of acoustic tones for transmission by the speaker 50 to a microphone (not shown in FIG. 2) of the telephone 15 in order to test the outbound connectivity of the voice call.

The device 35 further comprises testing data 54 stored in the memory 60. In one embodiment, the testing data 54 indicates the quality of the inbound connectivity of the voice call. When the test is run on the telephone 15 such that acoustic tones are generated by the server 23 through the speaker (not shown in FIG. 2) of the telephone 15, the microphone 48 of the device 35 receives the tones. The testing application 52 then measures at least one parameter of each received tone and stores the measured parameters in the testing data 54. For example, the testing data 53 may indicate voice fidelity loss of the inbound voice call. The testing application 52 also accesses the test results from the testing data 54 in order to determine whether the quality of the voice call is acceptable. The display device 44 displays the testing data 54 and the determination made by the testing application 52 to the technician.

The cellular communication device 35 also has a voice conversion element 53, which is implemented in software and stored in memory 60. In other embodiments, the voice conversion element 53 may be implemented in hardware, firmware, or any combination of hardware, software, and firmware. The voice conversion element 53 is configured to convert audio signals, such as voice signals or acoustic tones generated by the testing application 52, into digital data and to packetize the digital data for transmission. As an example, the element 53 may packetize data in accordance with voice over Internet Protocol (VOIP) so that the web browser 56 may transmit the data packets through the cellular network 32. In other embodiments, other protocols may be employed. For packets received from the cellular network 32, the voice conversion element 53 is configured to depacketize such packets and to provide an audio signal based on the payload of the packets.

Note that the testing application 52, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

Figure 3:
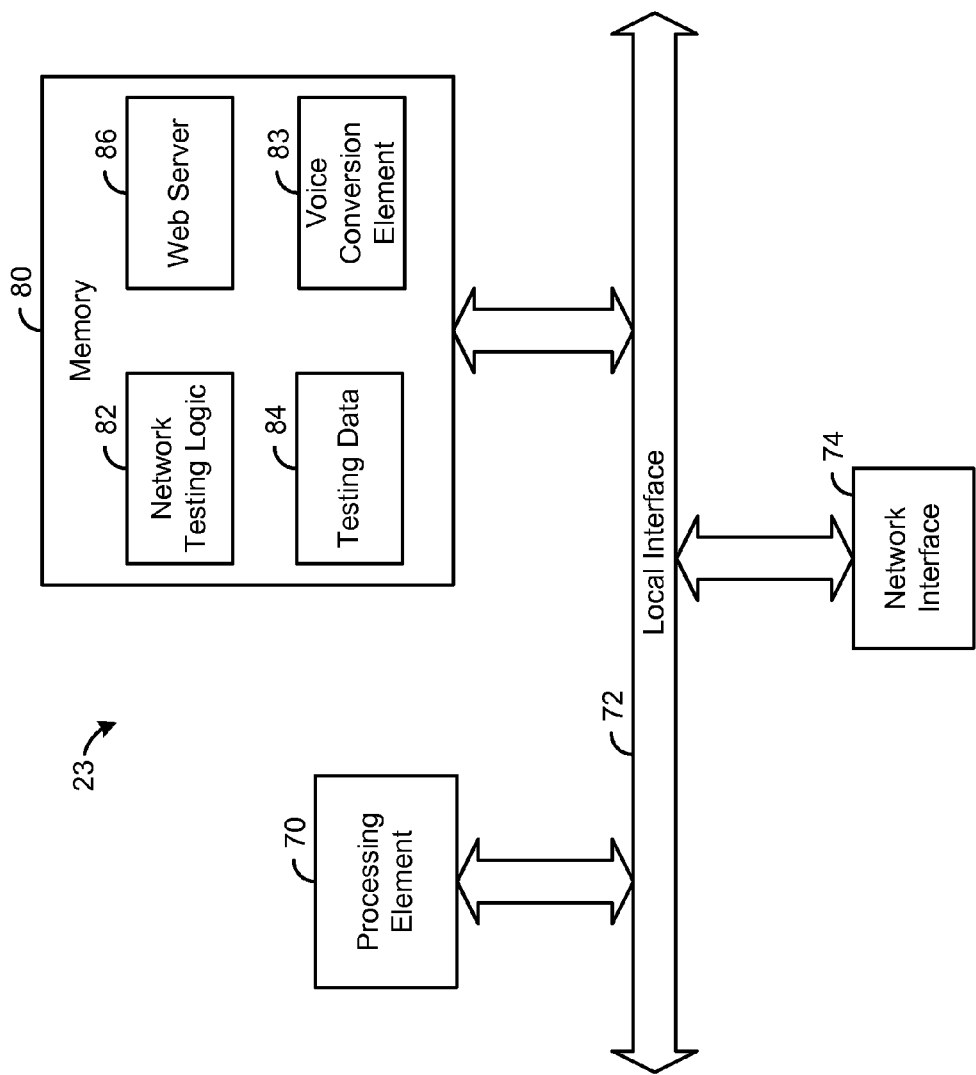
FIG. 3 is a block diagram depicting an exemplary embodiment of a server, such as is depicted by FIG. 1.

FIG. 3 depicts an exemplary embodiment of the server 23 of FIG. 1. The server 23 comprises at least one conventional processing element 70, such as a central processing unit (CPU) or digital signal processor (DSP), that communicates to and drives the other elements within the server 23 via a local interface 72. Furthermore, a network interface 74 can be used to communicate with other components of the network 25.

The server 23 further comprises network testing logic 82. The network testing logic 82 may be implemented in hardware, software, firmware, or any combination thereof. In the embodiment depicted by FIG. 3, the network testing logic 82 is implemented in software and stored in memory 80. The network testing logic 82 is configured to communicate with the testing application 52 (FIG. 2) via the data connection through the cellular network 32 and to originate and terminate voice calls to the telephone 15 (FIG. 1) across the subscriber line 21 (FIG. 1). In one embodiment, the testing application 52 communicates with the network testing logic 82 through the web browser 56 (FIG. 2) and a web server 86. The web browser 56 transmits data across a data connection through the cellular network 32 using TCP/IP, and the web server 86 is configured to support such protocol in order to facilitate communication across the data connection. However, other transport protocols are possible in other embodiments.

The server 23 also has a voice conversion element 83, which is implemented in software and stored in memory 80. In other embodiments, the voice conversion element 83 may be implemented in hardware, firmware, or any combination of hardware, software, and firmware. The voice conversion element 83 is configured to convert audio signals, such as acoustic tones received from the telephone 15, into digital data and to packetize the digital data for transmission. As an example, the element 83 may packetize data in accordance with voice over Internet Protocol (VOIP) so that the web server 86 may transmit the data packets through the cellular network 32. In other embodiments, other protocols may be employed. For packets received from the cellular network 32, the voice conversion element 83 is configured to depacketize such packets and to provide an audio signal based on the payload of the packets.

Note that the network testing logic 82, when implemented in software, can be stored and transported on any computer-readable medium for use by or in connection with an instruction execution apparatus that can fetch and execute instructions.

To test the downstream channel, the network testing logic 82 is further configured to sequentially generate a plurality of acoustic tones for transmission across the subscriber line 21, through the speaker (not shown in FIG. 3) of the telephone 15, and to the microphone 48 of the cellular communication device 35. Furthermore, the network testing logic 82 is configured to receive a plurality of tones from the speaker 50 of the device 35 through the microphone (not shown in FIG. 3) of the telephone 15 via the subscriber line 21 when the telephone 15 and the device 35 are acoustically coupled in order to test the upstream channel. When such tones are received from the device 35, the network testing logic 82 measures at least one parameter of each received tone and stores the measured parameters in the testing data 84. The network testing logic 82 may then access the test results from the testing data 84 and determine whether the quality of the outbound voice call is acceptable. The logic 82 then transmits such determination and/or the testing data 84 to the testing application 52 of the cellular communication device 35 for rendering to the user.

Figure 4:
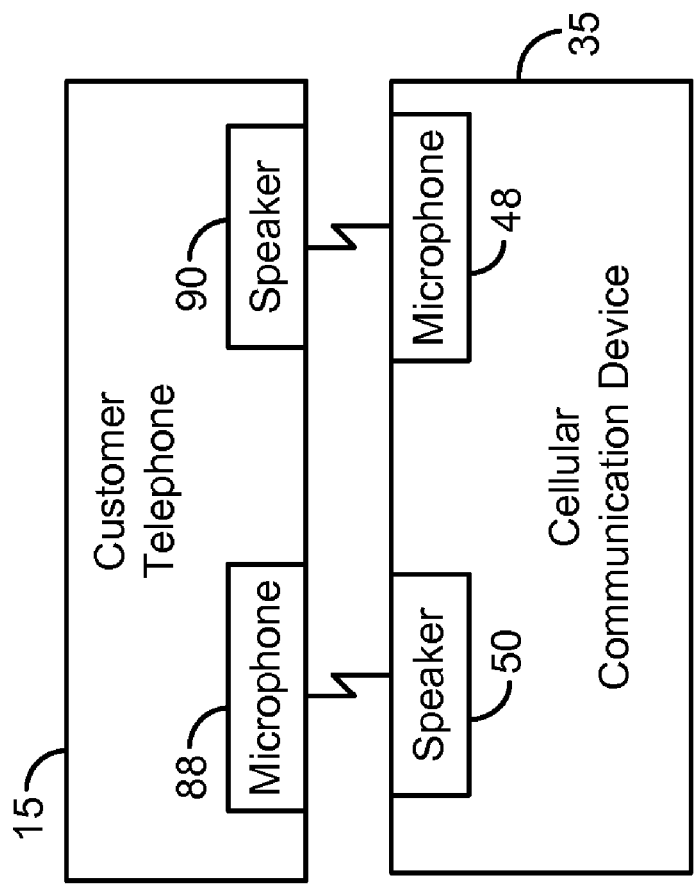
FIG. 4 depicts an exemplary embodiment of a cellular communication device acoustically coupled to a telephone, such as is depicted by FIG. 1.

FIG. 4 depicts the customer telephone 15 acoustically coupled to the cellular communication device 35. Upon installation of the telephone 15 at the customer premises 17 (FIG. 1), the technician performs one or more tests to determine the quality of the communication enabled by the telephony equipment at the customer premises 17 and subscriber line 21. As shown by FIG. 4, in one embodiment, the technician positions the cellular communication device 35, such as, for example, a cellular telephone, in close proximity (e.g., about an inch or less) to the telephone 15. The technician aligns the speaker 50 of the device 35 with a microphone 88 of the telephone 15 such that the speaker 50 and microphone 88 directly face one another, and the technician aligns the microphone of the device 35 with a speaker 90 of the telephone 15 such that the speaker 90 and microphone 48 directly face one another. In one embodiment, the technician may use an apparatus (not shown) to hold the device 35 in alignment with the telephone 35, but use of such a holding apparatus is unnecessary.

Once the device 35 and the telephone 15 are acoustically aligned, a test is initiated such that the server 23 (FIG. 1) or telephone 15 initiates a voice call between the telephone 15 and the server 23 and such that a plurality of acoustic tones are transmitted across the subscriber line 21 (FIG. 1). In one embodiment, the testing application 52 communicates with the server 23 through the data connection passing through the cellular network 32 such that the server 23 initiates a voice call with the telephone 15 across the subscriber line 21 and transmits the acoustic tones via the voice call. The tones are emitted by the speaker 90 of the telephone 15 and sensed by the microphone 48 of the device 35. The test results are stored in the testing data 54 (FIG. 2) and analyzed by the testing application 52 (FIG. 2) in order to determine the quality of the inbound connectivity of the voice call, as set forth above.

Note that are a variety of test types that may be performed and a variety of parameters that may be measured for the tests. In one exemplary embodiment, the testing application 52 measures the power level of the received tone and compares the measure power to a predefined threshold. If the measured power level is exceeded, then the testing application 52 determines that the quality of the downstream channel is adequate for the frequency range of the measured tone.

For each such tone, the testing application 52 displays information indicative of the test to the user of the device 35 via the display device 44 (FIG. 2) or otherwise. As an example, the testing application 52 may display the measured parameters and/or information indicative of the determination regarding whether the quality of the downstream channel is adequate. Thus, while the technician is at the customer premises 17, he or she receives testing information from the device 35 indicative of the quality of the downstream channel, thereby providing the technician with more information about such quality than he or she would have by just simply calling the telephone 15 via the cellular communication device 35 or calling the cellular communication device 35 via the telephone 15. Further, the testing process using the cellular communication device 35 is relatively simple and not as burdensome or time consuming as having to connect a conventional line tester to the subscriber line 21. In addition, a technician is likely to carry some cellular communication devices 35, such as PDAs or cellular telephones, during installation or maintenance such that the technician has immediate access to the device 35 for testing at the conclusion of the installation or other type of service.

During the voice call used for testing the downstream channel, the testing application 52 of the device 35 also generates a plurality of acoustic tones for testing the upstream channel. Such tones are emitted by the speaker 50 of the device 35 and sensed by the microphone 88 of the telephone 15. The tones are then transmitted across the subscriber line 21 to the server 23 and measured by the network testing logic 82, which stores information indicative of such measurements in the testing data 84. The network testing logic 82 also analyzes the test results and transmits a signal indicative of the test results to the testing application 52 (FIG. 2) of the cellular communication device 35 via a data connection through the cellular network 32.

The tests on the acoustic tones for testing the upstream channel may be similar to the tests described above for the downstream channel. In addition, the testing application 52 may be configured to display similar information about the upstream test as described above for the downstream tests. In this regard, the network testing logic 82 may be configured to transmit information indicative of the measured parameters of the upstream tones to the testing application 52, which displays such information. In addition, the network testing logic 82 may assess whether the upstream channel is adequate for each tone and provide information of such assessments to the testing application 52, which displays such information. Accordingly, the quality of both the inbound and outbound connectivity of the voice call may be determined and displayed by the device 35 to the technician. Note that, in other embodiments, the order of transmission of tones by the server 23 and the testing application 52 may vary or alternate relative to the embodiments described above.

In one exemplary embodiment, assume that the customer telephone 15 is installed at the customer premises 17 by a service technician who is carrying the cellular communication device 35. Also assume that the cellular communication device 35 has a web browser 56 capable of transmitting data through the cellular network 32 using TCP/IP. Further assume that the NAD 19 comprises a DSLAM and the NAD 30 comprises a switch.

Figure 5:
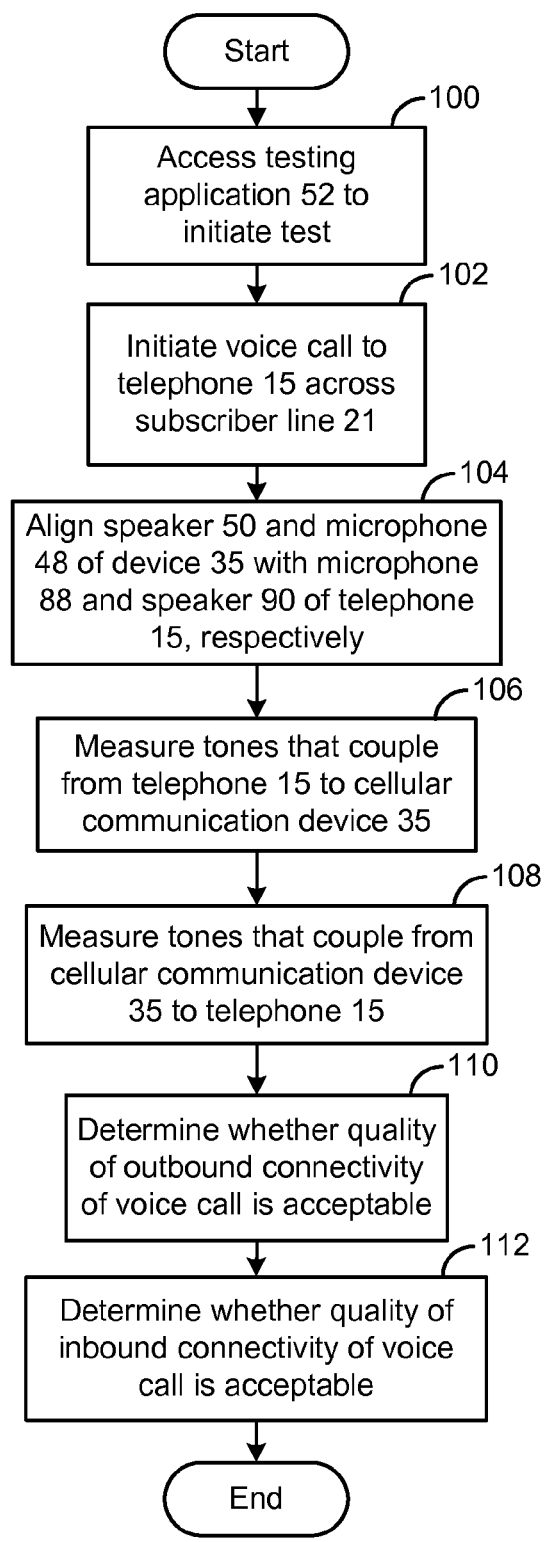
FIG. 5 is a flowchart illustrating an exemplary method of automating voice service verification.

Once the telephone 15 is installed at the customer premises 17, the technician accesses the testing application 52 on the cellular communication device 35 in order to initiate a test, as shown by block 100 of FIG. 5. In response, the testing application 52 establishes a data connection with the server 23 through the cellular network 32 by accessing the web server 86 through the web browser 56. The testing application 52 provides the server 23 with sufficient information to initiate test, such as the telephone number of the telephone 15. The network testing logic 82 of the server 23 initiates a voice call to the telephone 15 across the subscriber line 21 via the NAD 19, as shown by block 102.

Once the voice call is initiated, the technician takes the telephone 15 off hook and acoustically couples the telephone 15 and the device 35 by bringing the handset of the telephone 15 in close proximity to the device 35, aligning the speaker 50 of the device 35 with the microphone 88 of the telephone 15, and aligning the microphone 48 of the device 35 with the speaker 90 of the telephone 15, as shown by block 104. During the voice call, the server 23 sequentially generates a plurality of acoustic tones, which are emitted by the speaker 90 of the telephone 15 and sensed by the microphone 48 of the device 35. Such tones are measured by the testing application 52, as shown by block 106, and the test results are stored in the testing data 54 of the device 35. The device 35 also sequentially generates a plurality of acoustic tones which are emitted by the speaker 50 of the device 35 and sensed by the microphone 88 of the telephone 15. Such tones are measured by the network testing logic 82, as shown by block 108, and the test results are stored in the testing data 84 of the server 23.

The network testing logic 82 then accesses the test results from the testing data 84 and determines whether the quality of the outbound connectivity of the voice call is acceptable, as shown by block 110. The logic 82 transmits such determination and/or other information based on the testing data 84 to the testing application 52. The testing application 52 accesses the test results from the testing data 54 and determines whether quality of the inbound connectivity of the voice call is acceptable, as shown by block 112. The test results for the inbound and outbound connectivity of the voice call are then displayed by the device 35 to the technician.

It should be noted that various changes and modifications to the exemplary embodiments described above are possible. As an example, the acoustic tones used to test the telephony equipment at the customer premise 17 may be transmitted across the data connection passing through the cellular network 32. In this regard, in one embodiment, the testing application 52 is configured to generate at least one acoustic tone, and the voice conversion element 53 is configured to packetize the acoustic tone into one or more data packets for transmission across the data connection through the cellular network 32 to the server 23. The voice conversion element 83 at the server 23 is configured to depacketize the received data packets in order to recover the acoustic tone generated by the cellular communication device 35. The server 23 then transmits the acoustic tone via a voice connection through the network 25 and the network access device 19 to the telephone 15 via the subscriber line 21. In such embodiment, the speaker 90 of the telephone 15 emits the acoustic tone, which is sensed by the microphone 48 of the cellular communication device 35, and the testing application 52 may then measure the sensed tone to determine a parameter indicative of the quality of the communication enabled by the telephone 15, subscriber line 21, and/or other telephony equipment, as described above.

In the upstream direction, the testing application 52 may generate at least one acoustic tone that is emitted by the speaker 50 and sensed by the microphones 88 of the telephone 15. Such acoustic tone is transmitted via a voice connection from the telephone 15 through the network access device 19 via the subscriber line 21 and to the server 23. The voice conversion element 83 at the server 23 is configured to packetize the acoustic tone into one or more data packets for communication across the data connection from the server 23 to the cellular communication device 35 through the cellular network 32. The voice conversion element 53 of the cellular communication device 35 then depacketizes such data packets to recover the acoustic tone, and the testing application 52 then measures the tone to determine a parameter indicative of the quality of the communication enabled by the telephone 15, subscriber line 21, and/or other telephony equipment, as described above.

The use of the data connection through the cellular network 32 helps to prevent the cellular network from affecting the measured parameter of the acoustic tone. That is, the use of such data connection helps to reduce the amount of interference introduced to the acoustic tone by the cellular network 32 since the communication of digital data via a data connection can typically be achieved with less distortion than the communication of an analog signal through a cellular voice connection. Thus, by keeping the distortion introduced by the cellular network 32 low, the measured parameter is better indicative of the quality of the communication between the telephone 15 and the network 25. However, if desired, a voice connection through the cellular network 32 may be used instead of a data connection.

Further, if desired, the server 23 may be configured to perform various diagnostic tests to diagnose any communication problem revealed by the test. For example, in response to a failed test or a measured parameter (e.g., a received power level of a sensed tone) within a predefined range, the server 23 may be configured to initiate a network diagnostic test. As a mere example, if the server 23 the attempt to establish a voice connection with the customer telephone 15 fails, the testing application 52 may be configured to determine whether call set-up completed correctly. In another example, the testing application 52 may be configured to test a segment of the voice connection in an attempt to isolate the communication problem. For example, the testing application 52 may communicate with the network access device 19 to test the path from the server 23 to the network access device 19. If such test completes successfully, the testing application 52 may assume that the communication problem is between the network access device 19 and the customer telephone 15 and/or perform another test for another segment of the voice connection. The results of any diagnostic test may be transmitted to the cellular communication device 35 via the data connection passing through the cellular network 32 or otherwise in order to report such results to the user of the device 35. Various other types of diagnostic tests may be performed by the testing application 52 in other embodiments.

Various other changes and modifications to the exemplary embodiments described above would be apparent to one of ordinary skill upon reading this disclosure.

The invention claimed is:

1. A communication system, comprising:
   a customer telephone located at a customer premises, the telephone coupled to at least one subscriber line;
   a server in a telecommunication network, the server coupled to the subscriber line and configured to establish a voice call with the telephone across the subscriber line, the server further configured to communicate an acoustic tone with the telephone via the subscriber line during the voice call; and
   a cellular communication device configured to communicate with the server via a cellular network, wherein the cellular communication device and the telephone are acoustically coupled such that the acoustic tone is communicated between the cellular communication device and the telephone, wherein the cellular communication device is configured to determine a parameter indicative of a quality of a transmission of the acoustic tone via the subscriber line and the telephone and to provide an output to a user of the cellular communication device based on the parameter.

2. The communication system of claim 1, wherein the cellular communication device is configured to communicate with the server via a data connection through the cellular network.

3. The communication system of claim 2, wherein the cellular communication device is configured to communicate with the server via the data connection through the cellular network using Transmission Control Protocol/Internet Protocol (TCP/IP).

4. The communication system of claim 2, wherein the cellular communication device comprises a web browser and the server comprises a web server, and wherein the web browser is configured to communicate with the web server via the data connection.

5. The communication system of claim 1, wherein the server is further configured to measure the parameter and to transmit data indicative of the measured parameter to the cellular communication device.

6. The communication system of claim 1, wherein the cellular communication device is configured to receive the acoustic tone.

7. The communication system of claim 1, wherein the cellular communication device comprises a speaker and a microphone, and wherein the telephone comprises a speaker and a telephone, and wherein the speaker of the cellular communication device is aligned with the microphone of the telephone, and wherein the microphone of the cellular communication device is aligned with the speaker of the telephone.

8. The communication system of claim 1, wherein the service is configured to initiate a diagnostic test in response to a problem in establishing the voice call.

9. A method for testing telephony equipment, comprising the steps of:
   initiating a voice call to a telephone across a subscriber line, the telephone having a speaker and a microphone;
   aligning the speaker of the telephone with a microphone of a cellular communication device;
   transmitting a first acoustic tone across the subscriber line to the telephone;
   audibly emitting the first acoustic tone via the speaker of the telephone such that the first acoustic tone is sensed by the microphone of the cellular communication device;
   measuring a parameter of the first acoustic tone sensed by the microphone; and
   providing an output indicative of a quality of transmission of the first acoustic tone via the subscriber line and the telephone based on the measuring step.

10. The method of claim 9, further comprising the steps of:
    aligning a speaker of the cellular communication device with a microphone of the telephone;
    audibly emitting a second acoustic tone via the speaker of the cellular communication device such the that the second acoustic tone is sensed by the microphone of the telephone;
    transmitting the second acoustic tone from the telephone across the subscriber line;
    measuring a parameter of the second acoustic tone; and
    providing an output indicative of a quality of transmission of the second acoustic tone via the subscriber line and the telephone.

11. The method of claim 9, wherein the measuring step is performed by the cellular communication device.

12. The method of claim 9, wherein the initiating step comprises the steps of:
    establishing a data connection through a cellular network between a network server and the cellular communication device; and
    establishing a voice connection from the network server to the cellular communication device.

13. The method of claim 12, further comprising the step of transmitting the first acoustic tone across the data connection.

14. A method for testing telephony equipment at a customer premises, comprising the steps of:
    initiating a voice call with a telephone at the customer premises via a subscriber line coupled to the telephone;
    transmitting an acoustic tone across the subscriber line during the voice call;
    positioning a mobile communication device in close proximity to the telephone such that the telephone and the mobile communication device are acoustically coupled during the voice call;
    communicating the acoustic tone between the telephone and mobile communication device;
    measuring a parameter of the acoustic tone; and
    providing information based on the measured parameter to a user of the mobile communication device.

15. The method of claim 14, further comprising the steps of:
    establishing a data connection through a cellular network between the mobile communication device and a server; and
    causing, via the data connection, the server to initiate the voice call with the telephone.

16. The method of claim 15, further comprising the step of initiating a diagnostic test in response to a problem with the establishing step.

17. The method of claim 14, further comprising the steps of:
    establishing a data connection through a cellular network between the mobile communication device and a server; and
    transmitting the acoustic tone across the data connection.

18. The method of claim 14, further comprising the steps of:
    emitting the acoustic tone via a speaker of the telephone; and
    sensing the acoustic tone via a microphone of the mobile communication device.

19. The method of claim 18, wherein the measuring step is performed by the mobile communication device.

20. The method of claim 14, further comprising the steps of:
    emitting the acoustic tone via a speaker of the mobile communication device; and
    sensing the acoustic tone via a microphone of the telephone.

* * * * *